Figure 1:
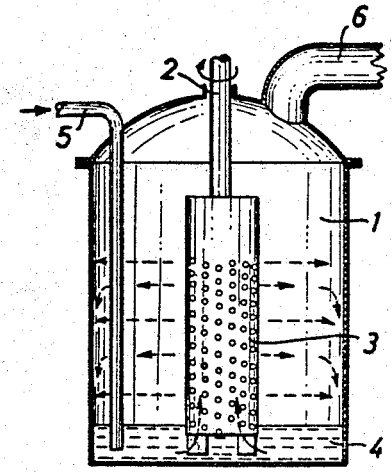
Figure 2:
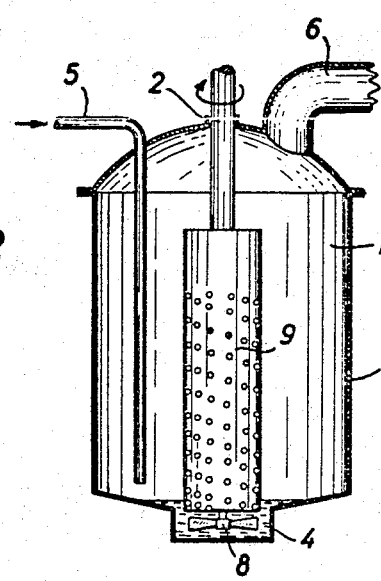

April 28, 1964   E. BILLER   3,131,212
PROCESS FOR CARRYING OUT CHEMICAL REACTIONS IN
A LAYER OF SPRAYED WHIRLING LIQUID
Filed Dec. 31, 1957

INVENTOR:
EFIM BILLER
BY Burgess, Dinklage & Sprung
ATTORNEYS

United States Patent Office 3,131,212
Patented Apr. 28, 1964

3,131,212
PROCESS FOR CARRYING OUT CHEMICAL REACTIONS IN A LAYER OF SPRAYED WHIRLING LIQUID
Efim Biller, Wundstrasse 58/60, Berlin-Charlottenburg, Germany
Filed Dec. 31, 1957, Ser. No. 706,887
Claims priority, application Germany Jan. 3, 1957
7 Claims. (Cl. 260—468)

This invention relates to a process by means of which chemical reactions can be carried out in an improved manner, and to an apparatus for carrying out this process.

It is known that the reaction or conversion of participants in chemical reactions depends on a number of different factors. In addition to the position of the equilibrium constants of the reaction concerned, which position indicates to what extent the reaction can proceed in equilibrium under the reaction conditions, there are other values which are of importance for actually carrying out these reactions, these values being for example the reaction velocity, the readiness of the molecules for reaction, displacement of the equilibrium by removal of the end products, the presence of catalysts and others. With reactions in which the reactants are not present in a homogeneous phase, for example with the reaction of gases with liquids not having relatively strong dissolving power for the gas concerned, or of gases with solid substances, or the reaction of liquids which are not miscible with one another, or of liquids with solid substances or of different solid substances with one another, the common surface of contact of the substances is of decisive importance. The smaller this surface of contact, the slower will be the reaction of the reactants. The same phenomenon occurs with the supplementary use of activators or catalysts which are present in a non-homogeneous phase with the reactants under the reaction conditions or with the addition of other diluents or the like which are not miscible in a homogeneous phase. In the most unfavourable case, the ratio between contact time and common contact surface of the reactions can be such that a reaction under normal conditions does not occur or only occurs to such a small degree that these reactions cannot be considered for technical purposes.

Attempts have been made in the art to counteract these difficulties by various auxiliary measures adapted to the prevailing conditions. For example, additional solvents are used which dissolve the reactants in an adequate manner, whereby the reaction takes place in the homogeneous phase of the solvent. Furthermore, attempts have been made to provide a large common contact surface by the finest possible mixing. In the reaction of gases with liquids, the gases are for example split up by frits or other gas-distributing devices, into very small bubbles which are conducted through the liquids. Efforts have been made to achieve further mixing by additional stirring.

It has also been attempted to mix immiscible liquids as intimately as possible with one another by vigorous stirring. When solid reactants are present, these are finely divided before the reaction in order in this way to be able to offer a large surface to the reactants. In other cases, increased pressure is used to increase the concentration of readily volatile reaction components in the reaction mixture and thus also to increase the common surface of contact with the other reactants. Other processes in their turn use auxiliary agents such as emulsifiers in order to achieve sufficient dispersion of the reaction components.

A process has now been discovered by which chemical reactions in which at least one liquid participates as a reaction component or as a treating medium are facilitated and simplified in a surprising manner.

The invention provides a process for carrying out chemical reactions by reacting or treating at least one gaseous component with at least one liquid component in a sprayed condition, wherein the liquid component is repeatedly sprayed and recycled inside a reaction vessel to form a reaction zone filled by a whirling spray of the liquid component, and the gaseous component is passed through this reaction zone. The spraying of the liquid component thus causes the formation of a reaction space filled by liquid fractions sprayed in the manner of a whirled layer, the gaseous reactants and any gaseous diluents which may be present being passed through the reaction chamber. Consequently, only some of the reactants or reaction auxiliaries which participate in the reaction have to be present under the reaction conditions as liquids, suspensions or emulsions which are capable of being sprayed, while the remainder can be introduced in the gaseous phase into the spraying zone which is formed.

The spraying is advantageously carried out inside the reaction vessel in a circulatory process, so that the sprayed liquids, suspensions or emulsions are sprayed several times or are always sprayed afresh after running down the wall of the vessel.

The velocities used when spraying the liquids are preferably such that at least two litres of liquid per litre of reaction space and per hour, but preferably at least 10 litres of liquid per litre of reaction space and per hour are sprayed.

The great facilitation and acceleration of the reaction with the process in accordance with the invention is inter alia made possible by the spraying causing the reaction mixture to be intimately mixed and secondly causing the reactants to act on one another with an extremely large surface, whereby the conversion of the reactants is promoted.

Apparatus which are suitable for carrying out the process according to the invention are those by which the liquids can be sprayed in a sufficiently fine form. For this purpose, it is advisable to use apparatus which spray the liquids with the indicated high velocities and with which more especially the liquids can be sprayed inside the reaction vessel in circulation. In this way, for example, the throughput of reaction mixture through the reaction vessel per unit of time is high, and the same applies as regards the yield. Furthermore, due to spraying in circulation, the reaction is additionally facilitated by the rapid exchange of liquid in the spraying zone. The surface of the liquid droplets which is charged with reacted product and consequently is no longer so reactive is quickly destroyed, while fresh surface ready for reaction is always reformed afresh in large quantity. In addition, the sprayed liquid is not able to combine to form relatively large droplets during the short length of stay in the spraying zone, whereby their surfaces would be reduced in size.

Spraying apparatus or devices which have proved to be particularly suitable are those in which the liquid is raised on the inside of a rapidly rotating casing provided with small apertures, is then thrown outwardly by centrifugal force through these apertures into the spraying zone and thereafter again runs down on the wall of the reaction vessel, in order then to be sprayed afresh from the bottom of the reaction vessel. The nature of the spraying zone and thus the reaction effect can for example be varied by the speed of the rotating movement and by the size and the arrangement of the apertures on the rotating casing. As already mentioned, it is advisable to carry out the spraying at high velocities. Satisfactory results are for example obtained when the rotor is rotating at 700–1400 r.p.m., but higher or lower speeds can be used, according to the required formation of the sprayed layer. Thus, high speeds of rotation of for example 2800 r.p.m. give a considerably greater circulation of the liquid and thus a more rapid exchange of the sprayed particles than low speeds of revolution. Of contributory importance for the speed of the circulation and thus for the formation and efficacy of the layer filled by sprayed whirling liquid particles when using these arrangements is also the construction of the suction device at the base of the rotor dipping into the liquid. Even simple scoops or blades produce satisfactory results. High circulation outputs can for example by produced by means of suction-type propellers. In this way, comparatively high circulation outputs can be successfully produced in small apparatus. For example, a propeller with a diameter of 60 mm. produces a suction output of 20 cubic metres per hour at 1400 r.p.m. and 40 cubic metres per hour at 2800 r.p.m. Whereas a propeller with a diameter of only 80 mm. supplies 80 cubic metres per hour at 2800 r.p.m., it is for example possible with a propeller diameter of 300 mm. to circulate 1500 to 1800 cubic metres per hour. By suitable design of the casing and of the suction device, it is even possible at the indicated speeds of rotation to circulate 60 to 100 cubic metres of liquid per minute, but due to the repeated spraying in circulation, only a small fraction of this quantity of liquid must be present in the reaction vessel.

These figures can however be adapted to actual requirements by variations, for example in the design of the casing, the spraying height or the speed of revolution. The liquid surface can moreover be influenced by the size and number of apertures in the rotor casing through which the liquid is projected for forming the spraying zone. Naturally, it is larger with many small holes than it is with a few large holes. By suitable arrangement of these holes or apertures, for example in spiral form, it is possible to obtain a uniform filling of the reaction chamber with a sprayed whirling layer of liquid.

One diagrammatic view of such a spraying zone in which the reaction products leave the reaction vessel in gaseous form is shown in FIGURE 1 of the accompanying drawings. Rotatable in a reaction vessel 1 is a rotor 3 which is mounted on bearings 2 and by which a liquid layer 4 on the bottom of the reaction vessel is raised on the inside of the casing, from whence it is thrown outwardly again through discharge openings in the rotor casing into the reaction vessel 1. The reaction components or auxiliary agents are passed through a pipe 5 to the bottom of the reaction vessel or into the lower part of the sprayed whirling liquid layer and removed through a pipe 6 after travelling through the spraying zone.

If it is desired to shorten the length of stay of the reaction products in the spraying zone as compared with the natural length of stay, the natural discharge of reaction products being effected inter alia by the addition of fresh substance can for example be accelerated by introduction of an inert gas. In this way, it is possible to obtain extremely short lengths of stay under the reaction conditions, but nevertheless satisfactory conversions can be produced on account of the action of the spraying zone in promoting the reaction.

Independently of these separate features, it is however only necessary for carrying out the process according to the invention for an adequate reaction zone of sprayed liquid particles to be formed in a satisfactory manner inside the reaction vessel, the reaction components or diluents which are perhaps present in gaseous form being conducted into the said zone. A spraying of the liquid inside the reaction vessel at relatively high velocities and within the vessel in circulation is generally of considerable importance for the reaction of chemical reactants and provides the additional advantage that large amounts as regards spraying chamber volume can be produced with only small quantities of liquid per unit of time.

The process according to the invention can be carried out intermittently or continuously. With the intermittent process, the reaction mixture, which is more especially non-homogeneous, is sprayed in circulation in the reaction vessel until an adequate conversion has occurred. The use of spraying in circulation provides here all the advantages of the spraying zone, such as the large and always reforming surface of the reaction components.

The process according to the invention is however also particularly suitable for use in connection with reactions carried out continuously.

For carrying out the process according to the invention, the physical state of the reaction products under the reaction conditions is important. With the reactions of one group, the reaction products being formed are exclusively volatile under the reaction conditions, i.e., the reaction products leave the spraying zone spontaneously in the gas phase. The reactions in which partially or exclusively non-volatile reaction products are formed under the reaction conditions fall in another group.

The first type of reaction can be carried out in a particularly simple manner under conditions which are favourable from a technical and economic point of view. If at least one of the reactants under the reaction conditions is a liquid, this liquid is sprayed into the spraying zone, while the other reaction components and additional liquid agents are added at the rate at which the volatile reaction products leave the spraying zone. The dimensions of the reaction vessel are advantageously such that the amount of sprayed liquid in the spraying zone is large as compared with the amount of condensed liquid which is on the bottom of the reaction vessel and which is to be sprayed. In this way, while fully utilising the reaction-accelerating effect of the spraying zone, the length of stay of the compounds in the reaction zone is low. In the first place, this restricts the possibility of undesired secondary reactions, while secondly such a procedure has a favourable effect on the nature of the products, which it is known are generally improved if the length of stay under the reaction conditions, for example elevated temperatures, is relatively short.

The use of only small amounts of liquid during the spraying operation can for example be obtained by a reaction arrangement such as shown with other features by FIGURE 2. The bottom of the reaction vessel 7 is so designed in this case that the suction device 8 at the base of the rotor 9 dips into a recess in the bottom of the reaction vessel. Due to the slope of the remainder of the bottom of the reaction vessel, the sprayed liquid quantities running down on the wall are collected in the comparatively small bottom recess and can be again drawn upwardly from this recess through the rotor.

The suction device 8 is in this case constructed for example as a suction propeller, whereas simple blades are shown by way of example as another possibility in FIGURE 1.

The quantities of liquid which are necessary for the process according to the invention and which are always present in the reaction apparatus therefore depend, as will be seen, on the dimensions and the design of the reaction vessels being employed. In suitable reaction apparatus, it is already possible with quantities of 1½–3 litres of liquid to build up a layer of whirling sprayed liquid particles, this layer providing the basis for reactions on a technical scale. These extremely small quantities of liquid are of relatively high importance, especially for the reactions in the presence of sprayed catalysts. It is obvious that according to the choice of the apparatus, it is also possible to use considerably larger quantities of liquid if this should be desired. The quantity of liquid which it is possible to use is therefore practically without any upper limit.

In many cases, for example at high reaction temperatures, it can be advantageous for the compounds to be reacted or additionally supplied products to be preheated before being introduced into the reaction vessel. This is achieved by the fact that the compounds concerned are conducted through a preheater before being supplied to the reaction vessel, the products being brought to the required temperature in the said preheater.

The temperature range inside the reaction vessel which is necessary for the reaction can be set in a very simple manner when using the process according to the invention. Due to the rapid circulation of the liquid and the associated downward flow of a large quantity of liquid per unit of time on the inside wall of the reaction vessel, a good heat exchange takes place between the sprayed liquid and the wall of the reaction vessel. The temperature range necessary for the reaction can therefore be maintained in a simple manner by external cooling of the reaction casing with exothermic reactions and by heating the said casing with endothermic reactions.

In order to achieve an even more intensive heat exchange, suitable heating or cooling devices such as heating coils, heating groups or the like can be arranged in the spraying zone or in the liquid on the bottom of the reaction vessel. It is however also possible to dissipate the heat of reaction being set up by evaporating one or more reactants or reaction auxiliaries. The quantities discharged can then be returned directly to the reaction vessel by reflux cooling or can be isolated outside the reaction vessel and returned in circulation into the vessel. The features of the short length of stay under the reaction conditions and the readily controllable temperature by heat exchange of the liquid with the cooled or heated jacket of the reaction vessel or corresponding cooling or heating devices, which features are characteristic for the conversion of reaction mixtures by spraying in circulation, makes it valuable to use the process according to the invention with homogeneous reactions as well as with non-homogeneous reactions. By rapid spraying, it is also possible with said homogeneous reactions to effect large conversions per unit of time, it being possible for these conversions to be readily controlled at the temperatures to be used. What has already been stated is also applicable as regards the nature of the products only briefly exposed to the reaction conditions.

In one embodiment of this process, reactions are carried out which are assisted by the presence of catalysts.

The catalyst which is liquid under the reaction conditions or the dissolved, suspended or emulsified catalyst in a liquid which is not volatile or only sparingly volatile under the reaction conditions, is sprayed in circulation in the reaction vessel under the conditions necessary for the reaction. In this case, it is advisable to work with spraying velocities of at least two litres of liquid per litre of reaction space and per hour, but preferably at least 10 litres of liquid per litre of reaction space and per hour. The compounds to be reacted are then supplied to the bottom part of the spraying zone at the rate at which the reaction products leave the spraying zone and the reaction vessel. The compounds to be reacted can be supplied as gases, liquids or solid compounds, provided only that they do not deleteriously affect the spraying of the catalyst or of the catalyst mixture.

One particular advantage when reactions capable of being influenced catalytically are carried out by the process referred to is that only comparatively little liquid and thus little catalyst are required for forming a large catalytically active reaction chamber formed by sprayed whirling liquid quantities. In this way, the ratio between the product put through and the total quantity of catalyst present is displaced to a surprisingly strong extent in favor of the compounds to be reacted, i.e., the exploitation of a certain quantity of catalyst is substantially improved. By spraying in circulation at velocities of at least two litres but preferably 10 litres of liquid per litre of reaction space and per hour, large quantities of freshly sprayed catalyst having a fresh surface are offered to the reactants per unit of volume of the reaction space and per unit of time, the surface being adapted to be influenced by variation of the spraying velocity. The economy of the reactions concerned is of course considerably improved in this way, since the expense involved for freshly introduced catalyst or for replacing the catalyst lost due to soiling or inactivation is appreciably reduced. Whereas tall reaction columns, frequently several metres high, have so far been required for example for reacting gases with liquids or for reacting different gases with one another in catalytic liquids, the reactions according to the invention can be carried out with liquid of less catalytic activity in comparatively small devices which save space and material, this contributing to a further improvement in the economy of the reactions.

In addition to the variation of the indicated values or in addition to the variation of the catalyst introduced, a variation of the catalytic effect can also be produced by varying the concentration of the catalyst in the solution, suspension or emulsion. By means of this measure, it is possible substantially to control the reaction of the reaction components.

In cases where only insufficient reaction or conversion has occurred with the single treatment in the spraying zone, it is possible so to proceed that the product removed at the rear end is completely or largely reintroduced at the front and in this way passes several times through the same reaction vessel, or that several spraying zones are connected in series so that the reaction mixtures are conducted through a series of spraying zones, possibly with the further addition of one or more reaction components or reaction auxiliaries, until an adequate conversion has been obtained.

When several series-connected spraying zones are used, it can be advantageous to work in the separate spraying zones with different velocities and/or different liquid surfaces in each spraying zone. In one preferred form of the invention, the spraying is effected initially at a high velocity and with a large surface, while small velocities and smaller surfaces are used towards the end. In this way, initially forming liquid mists which are transferred from one to the other of the reaction vessels are finally broken up, so that the reaction products can be drawn off at the end without any difficulty.

When working with a stationary liquid phase in the reaction vessel and mainly gaseous reaction products, a continuous liquid exchange between the separate spraying zones can be obtained by the liquid phases of these zones being interconnected, whereby the discharged liquid quantities are automatically balanced again.

With the reactions of the aforementioned second group, with which some or all of the reaction products are not volatile, it is necessary to use a somewhat modified technique in the process, since the reaction products do not spontaneously leave the reaction vessel. In order that the reaction may be carried out continuously and easily, the reaction products should in this case advantageously form as liquids or dissolved, suspended or emulsified in inert liquids or an excess of the liquid starting material. When carrying out this process, the procedure is that the reaction mixture is continuously introduced into the reaction vessel, is here sprayed once or repeatedly under the reaction conditions and then is withdrawn as liquid, solution, suspension or emulsion in such a quantity from the reaction vessel that a satisfactory reaction has previously taken place.

If the reactions are to be influenced by catalysts, these are added to the initial mixture in suitable quantity. After leaving the reaction vessel, the mixtures of products can advantageously be so worked up that the unreacted initial products, and perhaps catalysts and/or inert treatment media are separated from the products which are required and returned to the process again at the front end. If solid substances are formed in a large quantity when operating in this manner, it is advisable to work with an excess of liquid starting material or with the use of an additional liquid solvent, suspension agent or emulsifier.

It is particularly advantageous to use solvents in such a quantity that the reaction products are removed at the reaction temperatures as homogeneous solutions, the main part of the solid product is precipitated by cooling externally of the reaction vessel and thereafter separated out, whereupon the liquid phase is returned to the reaction vessel.

The temperature and pressure conditions can be varied within any desired limits when using the process in accordance with the invention, provided only that the basic condition of the reaction, i.e., that all or part of the reaction mixture can be sprayed, is maintained. It is thus possible to operate at normal pressures, sub-atmospheric pressures or super-atmospheric pressures and at any desired temperatures. When continuous methods are used, it is however necessary to select the suitable process according to the volatility of the products being formed.

The overall dimensions of the layer of the sprayed whirling liquid components as regards height and lateral dimension are of decisive importance, in addition to the aforesaid many possibilities of variation to be adapted to existing conditions. This is particularly applicable if gaseous reactants are to be conducted through the spraying chamber, i.e., for example when carrying out chemical reactions in the presence of sprayed liquid catalysts, catalyst solutions, suspensions or emulsions. Since the capacity of the apparatus and thus the quantity of the products to be reacted per unit of time are larger in proportion as the volume of the spraying chamber is larger, the general aim will be to use comparatively wide reaction vessels in which the liquid droplets thrown off laterally can cover a considerable distance horizontally. Moreover, it is possible to alter the height of the sprayed layer by varying the height of the perforated casing. The choice of these conditions for the process nevertheless is closely dependent on the other conditions which are chosen, such as the number of apertures in the rotor casing, the speed at which the rotor rotates, the selected temperature range and the pressure in the reaction vessel, the reactivity of the compound to be converted, etc. Thus, with reactions which take place comparatively easily, satisfactory conversions can be obtained technically with a spraying height of 10 to 15 cm., whereas with reactions proceeding less readily, the spraying height can be lengthened as required, if necessary up to several metres, for example 3 to 5 metres. The lateral dimensions of the reaction vessel is to be so adapted to the actual spraying velocity that the sprayed liquid jets still reach the wall of the reaction vessel at a sufficient velocity, i.e., that a spraying chamber or zone is formed within the reaction vessel, this completely filling the space between the rotor and the vessel wall, so that the gaseous substances passing through must at all points actually travel through a uniformly thick sprayed layer and are not able laterally to reach that space at the heat of the reaction vessel which is filled with less satisfactorily sprayed liquid. Here also the dimensions which can be used in practice are from a few centimetres up to several metres, for example 3 to 5 metres.

The supply velocity of the compounds to be reacted or the reaction auxiliaries is determined by the prevailing conditions in the individual reactions. The following factors are for example essential as regards this supply velocity: the height and other dimensions of the spraying chamber, the velocity at which the liquid is sprayed, the reactivity of the compounds to be reacted and the degree of reaction which is required, and perhaps the occurrence of undesired secondary reactions, etc. With suitable variations of the conditions, it is possible to obtain a practically unlimited range of variation in the velocity of introduction.

If it is desired to control the reactions of the reactants in a certain direction, it is of course possible with the process according to the invention for the equilibrium in the reaction to be displaced in favour of the desired products being formed by adding certain undesired reaction products. In this connection, it is possible for these products from an undesired reaction to be conducted continuously into the reaction vessel together with the compounds to be reacted; it is however particularly advantageous for these undesired products to be initially placed in the reaction vessel. This particularly advantageous form of the invention can then be easily carried out if the boiling point of the undesired reaction products makes it possible for a limited quantity of these undesired products to be sprayed in circulation inside the reaction vessel, or if the differences in the boiling points between desired and undesired reaction products are so great that the separation of the desired and undesired reaction products is readily possible outside the reaction chamber, for example by partial condensation of the reaction vapours. A limited quantity of the undesired reaction products can also be used for displacing the equilibrium inside the reaction chamber.

The process in accordance with the invention can be used for all reactions of chemical reactants, provided that the main condition is fulfilled, which is the presence of at least one reaction component which is liquid under the reaction condition or one liquid treating agent under the same conditions. A limitation of the range of application is thus that at least some of the reaction mixture should be capable of being sprayed under the reaction conditions. The process in accordance with the invention can for example be advantageously used for reactions such as addition and cleavage reactions, substitution, polymerization, oxidation, hydrogenation and dehydrogenation reactions, ring-opening reactions, carbonylation and exchange reactions, saponification and condensation reactions, syntheses of compounds in the presence of a liquid phase, transposition and other reactions.

Individual reactions are set out in the following description as a number of examples, but it is to be expressly pointed out that the range of application is not limited to these examples. According to the invention, it is for example possible to carry out etherification processes (phenol ether from phenol and alcohol vapour) or the synthesis of compounds with water being split off (diphenylamine from phenol and aniline in the presence of phosphoric acid), of a basic ($NH_3$) molecule or acid ($HCl$) molecule, for example conversion of aniline and chlorobenzene to form diphenylamine, intramolecular cleavage processes of for example $NH_3$ (for example cyclohexylamine to cyclohexene), saponification of chlorinated aromatic hydrocarbons to phenols, such as chlorobenzene to phenol, dichlorobenzene to hydroquinone, the production of diphenyl oxide from phenol and chlorobenzene, as well as condensation processes with cleavage of organic molecules (for example ROH, wherein R represents a hydrocarbon radical). It is also possible to carry out saponification processes with water, organic or inorganic acids, bases (ammonolysis of sprayed chlorobenzene, mononitrochlorobenzene or dinitrochlorobenzene with ammonia) or organic molecules such as alcohols. As additional examples, there are to be mentioned addition processes, such as addition of water to olefines in the presence of sulphuric acid and perhaps heavy metal salts to form alcohols, the addition to acetylene of for example HCl, HCN, carboxylic acids, alcohols, etc., additions of low hydrocarbons to one another, for example conversion of olefines to branched benzines with a high octane number and also the converse reactions, molecule cleavages and water cleavages from alcohols to form the corresponding olefines. It is also possible with advantage to carry out substitutions such as halogenation processes, for example of hydrocarbons in the presence of sprayed heavy metal chloride melts or solutions to form methylene chloride, trichloromethane, chloroethane, monochloroethane, dichloroethane or trichloroethane and other chlorinated hydrocarbons, nitration processes, sulphonation processes, for example of benzene, and others. The process can also be used with advantage for polymerizing olefines, for example for polymerizing ethylene or other olefines in the presence of sulphuric acid, phosphoric acid or other acids and catalysts to provide benzines.

As examples of oxidation reaction, there are to be mentioned the oxidation of benzene to form maleic acid, of toluene to form benzoic acid, of p-xylene to form terephthalic acid, cyclohexane to form cyclohexanol and cyclohexanone and also adipic acid. It is also possible by the process according to the invention to oxidize naphthalene to form phthalic acid or phthalic acid anhydride, and also to form hydroperoxides, for example cumene hydroperoxide from cumene. The formation of epoxy compounds is also to be mentioned. Hydrogenation processes can be carried out if for example the catalyst is suspended in the liquid phase. It is possible in this way to synthesize hydrocarbons or alcohols from carbon monoxide and hydrogen or water vapour by the known processes, such as the Fischer-Tropsch process and others. Dehydrogenation of ethyl benzene to form styrene, alcohols to form aldehydes, butane to form butadiene and other dehydration processes, for example in the presence of alkali hydroxides and if necessary heavy metal oxides at temperatures from 200 to 500°, can be carried out in a particularly advantageous manner. Ring cleavage reactions, for example with furfurol condensation products, tetrahydrofurane or epoxides to form the corresponding diols, can be carried out with the process according to the invention in the same way as molecule transpositions. The process according to the invention can also be used for the known carbonylation reactions, such as the production of carboxylic acids from olefines, water and carbon monoxide, as well as for exchange reactions of the type of $H_2O + D_2 \rightarrow HDO + HD$.

However, as already mentioned these reactions are not to be considered as a limitation as regards the range of application of the process in accordance with the invention.

In carrying out the process of the invention, it is found that as compared with the usual reaction arrangements, it is possible to produce surprising and sometimes new reaction effects. The readiness for reaction of the components to be reacted is increased to an extraordinarily high degree by the quickly sprayed liquid constituents which are in the form of a whirled layer according to the invention, so that hitherto unknown possibilities are provided for carrying out reactions. The activation produced by the whirled layer initially has quite generally the effect that either the reaction conditions such as pressure, temperature and the like hitherto normally considered to be necessary can be kept considerably more moderate for producing like and even better results or that by comparison with the known reaction arrangements, the reactions take place to an intensified degree.

This applies especially to reactions which take place in the presence of catalysts, and with the process according to the invention, the liquid, dissolved, suspended or emulsified catalysts are sprayed in the reaction vessel to form a whirled layer of sprayed droplets of liquid. The activity of known catalysts which are used in the process in accordance with the invention is increased by the spraying operation to a degree which could not be anticipated, so that it is not only possible considerably to improve the industrial economy of known processes, but in addition new methods can be devised for technical chemistry. Thus, by using the process according to the invention, it is for example possible to use comparatively gentle catalysts in reactions with which so far considerably stronger catalysts were required. In other cases, it is possible in an extremely simple manner to carry out reactions which it has so far only been possible to conduct by costly methods comprising several processing steps. Yet again, in other cases, it becomes possible to introduce new catalyst systems for certain reactions, which then show satisfactory results under the conditions according to the invention.

The process according to the invention is particularly valuable with catalytically influenced reactions in which catalysts are present in the form of suspensions or emulsions. Due to these suspensions or emulsions being sprayed in circulation inside the reaction vessel, the extremely fine dispersion of the catalytically active compounds can be maintained for any desired length of time. This possibility of acting on the condition of the catalyst during the reaction provides, in addition to the aforesaid advantages of the process according to the invention, the possibility of carrying out a large number of reactions which can be influenced catalytically, which reactions are to be generally influenced simply and satisfactorily in the direction actually required by the process of the invention.

With the spraying of liquids, suspensions or emulsions which are recycled in the reaction vessel over a relatively long period, that is to say, for example, in the carrying out of catalytically influenced reactions, using difficultly volatile or non-volatile catalysts, catalyst solutions, suspensions or emulsions, it is possible in one embodiment of the invention to allow these liquids to pass continuously to a second circulation in which they are subjected to a continuous regeneration or revival. In contrast to the first spraying circulation of the liquid, this second liquid circulation does not necessarily have to take place inside the reaction vessel, but liquid constituents are preferably continuously withdrawn, for example at the bottom of the reaction vessel, subjected to a regeneration treatment, such as washing, filtering, drying etc., outside the reaction vessel and thereafter returned to the said vessel.

The regeneration can generally be carried out in a very simple manner; for example, catalysts which are insensitive to water can be simply dissolved or suspended in water, purified and thereafter returned to the reaction vessel again with the insignificant quantities of water, this water then being discharged from the reaction apparatus for example by the reaction products.

In this way, the catalyst consumption of the process in accordance with the invention, which as such is already very low, can be still further considerably reduced, since for continuous reactions lasting over a relatively long time, it is not necessary for different catalyst charges to be successively introduced, but one catalyst charge can be continuously employed for any desired length of time and can be gradually regenerated and replaced.

In addition to the better use of the catalyst, the result is also obtained in this form of the invention that the operation can be carried out practically without any interruption for any desired periods of time.

In individual cases, however, regeneration of the catalyst can also take place inside the reaction vessel. If for example syrupy phosphoric acid is sprayed as catalyst, the water content of this phosphoric acid can be gradually reduced by the products flowing through the spraying chamber and thus the catalytic effectiveness of the phosphoric acid can perhaps be lowered.

In such cases, it is for example possible for the catalytic efficacy of the sprayed catalyst to be regenerated inside the reaction vessel by adding water or compounds which split off water, such as alcohol.

In illustration of such processes carried out in the presence of catalysts, there are described below certain preferred methods of carrying out the process of the invention.

It is thus for example particularly advantageous to carry out the process of the invention for the production of carboxylic acid esters from carboxylic acids, corresponding anhydrides or from other carboxylic acid esters and alcohols, ethers or olefines in the presence of esterification catalysts. The process according to the invention permits the production of the corresponding carboxylic esters in a simple manner.

According to the process for the production of carboxylic acid esters in the presence of esterification catalysts a catalyst which is liquid under the reaction conditions or which is dissolved, suspended or emulsified in a liquid medium inert towards the compounds to be reacted is sprayed in such a manner as to form a reaction zone filled with a whirling sprayed catalytically effective liquid into which reaction zone the carboxylic acid, its anhydride, or the carboxylic acid ester is conducted together with an alcohol, ether or olefine.

Suitable acid condensation catalysts for this process are for example acids such as phosphoric acid, and sulphuric acid, aromatic or aliphatic sulphonic acids, hydrochloric acid etc. Depending on the nature of these acids and the selected reaction conditions, acids which are liquid under the reaction conditions for example phosphoric acid or melted sulphonic acids may be sprayed without the addition of other agents. These acids may, however, also be sprayed in the form of solutions, suspensions or emulsions and, relatively high boiling, under the reaction conditions liquid suspension agents or solvents which as such have no effect upon the conversion of the reactants are advantageously used in addition to the acids.

It is, however, also possible to replace the free acids by the corresponding acidly reacting metal salts, in particular in the form of solutions or suspension, e.g., water containing melts of zinc chloride or $AlCl_3 \cdot 6H_2O$. These salts can also be used suspended in media which are inert towards the reactants.

Inert auxiliary agents for the reaction are preferably high boiling and under the reaction conditions liquid compounds which possess a sufficiently low volatility under reaction conditions to be sprayed in circulation as often as desired. This latter condition is not critical. It is equally possible to replace any evaporated portion by the addition of fresh material. Suitable materials to be used in the process of the invention are, e.g., natural or synthetic higher boiling paraffins, silicone oils, high boiling mineral oils etc.

The process of the invention concerning the production of carboxylic acid esters by reacting alcohols with carboxylic acids or other carboxylic acid esters is applicable to all carboxylic acids, their esters and alcohols hitherto used for such esterification or transesterification processes.

In carrying out the process of the invention two basic groups can be differentiated, one group in which the boiling point of the reaction products under the reaction conditions is above the temperature of the sprayed catalytic liquid, the other group in which they are below that temperature.

In a technically particularly simple embodiment of the process of the invention, the boiling points of the reaction products under the selected reaction conditions are below the temperature of the sprayed catalytically effected liquid. If the compounds to be reacted are introduced under these conditions for example into the bottom of the spraying zone then the products formed by the reaction pass through the spraying zone and can be separated above the layer filled with the sprayed liquid components. In this manner any desired amount of compounds to be reacted can continuously be passed through the spraying zone without there being any need of replacing the catalytically effective liquid.

The process according to the invention, however, also permits the production of carboxylic acid esters the boiling point of which under the reaction conditions is above the temperature of the sprayed liquid.

According to this embodiment of the process of the invention some of the liquid sprayed inside the reaction vessel is continuously decanted and the reaction products removed therefrom outside the reaction vessel, whereupon the catalytically active liquids are either recycled into the reaction zone or first purified and regenerated. In those preferred embodiments of the process, where the reaction products voluntarily leave the reaction vessel, such compounds are suited as starting materials which produce esters with relatively low boiling temperatures. Such materials among others are low fatty acids, such as formic acid, acetic acid, propionic acid, butyric acid and further saturated or unsaturated acids with straight or branched chains, in particular monofunctional acids or monofunctional aromatic carboxylic acids such as benzoic acid, toluic acid etc.

Carboxylic acids which produce higher boiling products, such as aliphatic or aromatic polyfunctional carboxylic acids, e.g., succinic acid, glutaric acid, adipic acid, cork acid, azelaic acid, sebacic acid, etc., isophthalic acid, phthalic acid, terephthalic acid or other aromatic dicarboxylic acids are preferably esterified according to the last enumerated embodiment of the invention. The same applies also to high monofunctional carboxylic acids such as oleic acid, stearic acid, palmitic acid and others.

The same applies to the selection of alcohols or ethers. Monofunctional, relatively low boiling alcohols and their ethers, e.g., low aliphatic alcohols with 1–6 carbon atoms favour the reaction according to the first embodiment, whereas higher boiling alcohols and their ethers such as aromatic or polyfunctional alcohols (glycols, glycerins, etc.) produce the reaction process of the second embodiment.

In addition to alcohols and ethers olefins are also suitable materials for the production of the carboxylic acid esters according to the invention. By treating carboxylic acids with olefins, e.g., ethylene, propylene or butylene according to the process of the invention, the corresponding carboxylic acid esters are obtained in relatively good yields. In this case the carboxylic acids are conducted into the layer filled with the whirled sprayed liquid together with the olefins and the thus obtained esters are separated from the reaction mixture according to the first or second mentioned process. According to the invention mixtures containing these olefins may also be used in addition to pure olefins. It is for instance possible to use gas mixtures which contain in addition to a gaseous olefin such as ethylene or propylene, e.g., saturated hydrocarbons such as ethane or propane.

According to a preferred embodiment of the process of the invention water containing solutions of carboxylic acids in particular dilute aqueous solutions with a water content of more than 50% are converted to carboxylic acid esters. In spite of the extremely large excess of water, these aqueous solutions of carboxylic acids also give good yields of carboxylic acid esters. If the esterification process is carried out with alcohols, these too may contain water. Thus the reaction of a 10% aqueous acetic acid with ethanol in the presence of sprayed syrupy phosphoric acid gives good yields of acetic acid ethyl ester. This form of carrying out the process is of particular importance in the separation or regeneration of carboxylic acids and alcohols from aqueous, in particular dilute aqueous solutions.

The temperature range used according to the invention is so chosen that it is high enough to permit a reaction but not high enough to lead to undesirable side reactions such as decompositions etc. With these limits, the temperature can vary to any desired extent. In carrying out the above mentioned continuous and particularly economical process for the production of carboxylic acid esters it is also necessary that the temperature in the reaction vessel is in each case higher than the boiling temperature of the products being formed. Temperature range of about 50–250° C., in particular 100–150° C. is particularly suited for carrying out the process of the invention.

The pressures to be applied in the process of the invention can vary to any desired extent provided the basic condition that the catalytically effective liquids remain sprayable is fulfilled. It is thus possible to work at normal pressures, subatmospheric or superatmospheric pressures.

A preferred range of presure are relatively low pressures up to approximately 15 atmospheres.

Under certain conditions it may be necessary to operate at subatmospheric pressures. If for instance reaction products are formed during the reaction the boiling temperature of which is at a normal pressure somewhat above the temperature of the sprayed catalytically effective liquid it is expedient to lower the boiling point of the reaction products by the application of subatmospheric pressures to such an extent that it is below the temperature of the reaction space. It thus becomes again possible to withdraw the reaction products continuously in a simple manner from the top of the reaction vessel and to use also such starting materials which lead to rather high boiling end products.

All that has been said for the production of carboxylic acid esters from free carboxylic acids, also applies to the production of carboxylic acid esters from carboxylic acid anhydrides and with the use of and by the transesterification of other carboxylic acid esters.

In the production of esters which are nonvolatile under the reaction conditions it has appeared that those esters can easily be removed from the reaction vessel which are suitable for steam distillation. According to a special embodiment of the process of the invention for the production of not easily volatile esters which, however, can be distilled together with steam superheated steam is introduced into the reaction vessel together with the compounds to be reacted. By this introduction of steam the reaction products and especially the esters are continuously carried out of the reaction vessel and can easily be separated behind the spraying zone.

Another especially preferred object of the invention relates to the nuclear alkylation of aromatic compounds, in particular to the alkylation of compounds with aromatic rings in the presence of acid catalysts. In this embodiment of the process of the invention it is not only possible to carry out known reactions for the ring alkylation of aromatic compounds in the presence of acid catalysts in a surprisingly simple and economically improved manner but to use novel catalysts or catalysts so far not used for such processes in the industrial production of nuclear alkylated aromatic compounds.

According to this preferred embodiment of the invention a catalyst which is liquid under the reaction conditions or which is dissolved, suspended or emulsified in a liquid medium inert towards the compounds to be reacted is sprayed in such a manner as to form a reaction zone filled with whirling sprayed catalytically effective liquids into which the aromatic compound is conducted together with the alkylation agent.

Compounds such as alcohols, ethers, alkyl halides and/or olefines are especially suitable as alkylation agents for the process of the invention. Alternatively, aromatic compounds carrying several alkyl substituents can be used as alkylation agents for alkylating the aromatic compounds. In this case, the alkylation of the aromatic substances is effected by trans-alkylation, i.e., at least some of the alkyl substituents of the aromatic compound carrying several alkyl substituents are incorporated into the compound to be alkylated.

In the carrying out of the process of the invention, acids such as phosphoric acid, sulphuric acid, aromatic or aliphatic sulphonic acids, are examples of suitable acid condensation catalysts. Depending on the nature of these acids and the reaction conditions selected, acids which are liquid under the reaction conditions can be sprayed without the addition of other agents. Examples of such acids are syrupy phosphoric acid and molten sulphonic acids. It is also possible however to spray solutions, suspensions or emulsions of these acids, it being possible for dispersing agents or solvents, which preferably have a comparatively high boiling point and must be liquid under the reaction conditions, to be used as well as the acids, the said dispersing agents of solvents per se not having any effect on the conversion of the reactants.

When these catalysts are used, the acids concerned can then be introduced into the process of the invention under the reaction conditions which are already known. Thus, for example, when concentrated sulphuric acid is used as alkylation catalyst, the reactions can be carried out at low temperatures, for example in the range up to about 50° C., whereas when syrupy phosphoric acid, for example, is used as catalyst, the temperature can be higher, for example in the range from 130 to 200° C. Benzene sulphonic acid and methane disulphonic acid are examples of suitable monofunctional or polyfunctional aromatic or aliphatic sulphonic acids.

Instead of the free acids, however, it is also possible to use corresponding acidly reacting metal salts, preferably in the form of solutions or suspensions. Examples of these are: anhydrous melts or concentrated, and in particular aqueous, solutions of zinc chloride or $AlCl_3.6H_2O$. It is however also possible for the salts to be introduced while suspended in agents which are inert with respect to the reaction components and products.

In one embodiment of the process of the invention, mixtures of several catalysts are sprayed into the reaction space. For example, a mixture of phosphoric acid and zinc chloride, with the introduction of hydrochloric acid, can be used for alkylating aromatic compounds by the process of the invention. However, other mixtures of different acid catalysts can be used, depending on requirements and the reaction conditions selected.

Suitable inert reaction agents for the production of solutions, suspensions or emulsions are again compounds with a high boiling point, but which are liquid under reaction conditions. Here again natural or synthetic higher boiling paraffins, silicone oils, high boiling mineral oils etc. are, e.g., suitable as suspension or emulsion agents, high boiling nitroparaffins as solvents.

It is also possible for the catalytic efficacy of the sprayed catalysts to be increased by adding activators. Particularly suitable as activators are additives which have a large surface, and/or metal salts. Finely divided metal powder, such as copper powder, or metal salts such as zinc phosphate can be used for example in order to activate phosphoric acid. The acid catalyst used in the process of the invention can be a Friedel-Crafts catalyst, for example anhydrous aluminum chloride, anhydrous zinc chloride or ferric chloride. The Friedel-Crafts catalysts are then sprayed into the reaction vessel, preferably in the form of a solution or suspension. High-boiling nitroparaffins or paraffins are for example suitable as solvents or dispersing agents. When this procedure is used, reaction conditions, such as temperatures of for example −10° to about 100° C. and atmospheric or superatmospheric pressure, can be used.

When alcohols are used as alkylation agents in the process of the invention, it is preferred to use aliphatic alcohols: especially suitable are aliphatic alcohols with 1–5 carbon atoms, such as methanol, ethanol, propanol-1, propanol-2, butanol-1, butanol-2, isobutanol, pentanols and isopentanols. When ethers are used as alkylation agents, the ethers of aliphatic alcohols with 1–5 carbon atoms are likewise preferred. When alkyl halides are used as alkylation agents, it is preferred to use chlorides of saturated hydrocarbons, especially hydrocarbons with 1–5 carbon atoms. Suitable in this case are alkyl halides which carry one or more halogen atoms, especially chlorine, on the alkyl chain. Compounds such as methyl chloride, ethyl chloride, propyl chloride, isopropyl chloride, methylene chloride and ethylene chloride can be used. When olefines are used as alkylation agents in the process of the invention, it is more advantageous to use the lower olefinic unsaturated hydrocarbons, especially those with 1–6 carbon atoms. Suitable in this case are straight-chained olefines such as ethylene, propylene and butene, or cyclic unsaturated hydrocarbons, for example cyclohexene, or branched unsaturated hydrocarbons.

The process of the invention is generally applicable to compounds having aromatic rings. It is particularly advantageous for the alkylation of aromatic compounds with a single aromatic ring system, such as benzene and its alkyl-substituted homologues, for example toluene and ethyl benzene, aromatic amines and phenols.

As already mentioned, for the production of low-alkylated products, and more especially for the introduction of only one alkyl substituent by the process of the invention, it is possible to use more highly alkylated aromatic compounds which are introduced into the reaction mixture together with the compounds to be reacted. The catalysts particularly suitable for this reaction are those of the type of the anhydrous Friedel-Crafts catalysts.

The course of the substitution reactions on the aromatic nuclei can be controlled to a large extent by the choice of the reaction conditions. If it is desired to obtain predominantly mono-alkylated products, or products containing only a few alkyl substituents, it is for example advisable to use an excess of the aromatic compounds in the reaction mixture. The excess of aromatic compounds can in this case amount to one or more times the quantities of aromatic substances which are theoretically necessary, and preferably at least 3–5 times the theoretical quantity of the aromatic compounds are generally employed.

It is however also possible for the course of the alkylation reactions to be influenced in other ways. For example, in order to produce low-alkylated products, it is possible for more highly alkylated compounds to be added to the reaction mixture from the outset. In this way, the equilibrium in the reaction is influenced in favour of the low-alkylated compounds so that a higher yield of the required products can thus be produced.

This procedure is particularly valuable when the more highly alkylated compounds can be placed in the reaction vessel and then sprayed. If the volatility of the more highly alkylated compounds is small enough to prevent these compounds from evaporating at the reaction temperature, a small quantity of these compounds can simply be sprayed in the reaction vessel together with the catalyst liquid. It is however also possible for the undesired products, for example more highly alkylated products, to be separated outside the reaction vessel and for these products to be returned directly to the vessel. This separation can be carried out in a particularly advantageous manner by partial condensation of the evaporated reaction products.

It has already been stated that the process of the invention can in principle be used in the known processes for the production of alkylated aromatic compounds in the presence of acid catalysts. In this embodiment of the process of the invention it is again possible to differentiate two groups according to the volatility of the reaction products under the reaction conditions. To the first group belong those reactions, in which the reaction products voluntarily leave the reaction vessel, whereas in the second group the reaction products are removed from the reaction vessel together with portions of the sprayed liquid.

With the procedure in which the reaction products leave the reaction vessel, of their own accord, it is particularly suitable to use starting materials which lead to products having comparatively low boiling points.

Examples of such aromatic compounds are benzene, toluene, ethyl benzene, aniline, N-alkyl anilines, toluidines, N-alkyl toluidines, phenol etc.

The same applies as regards the choice of the alkylation agent. Particularly suitable for this preferred procedure are lower aliphatic alcohols, the corresponding lower ethers, lower olefines, especially those with 1–6 carbon atoms and lower alkyl halides.

The lower limit of the temperature range used in the process of the invention is defined by the condition that the temperature must be sufficient for starting the reaction, while the upper limit is fixed by the need to avoid undesired secondary reactions such as decomposition reactions etc. Within these limits, the temperature can be varied almost as desired. For the embodiment in which the process is to be carried out continuously in a particularly economic manner and in which the reaction products leave the reaction vessel of their own accord, an additional condition is that the temperature in the reaction vessel should be higher than the actual boiling point of the products being formed under the conditions of the reaction.

For carrying out the process of the invention, therefore, the temperatures chosen are adapted to the catalyst being used. As already stated, these temperatures can fluctuate within a very wide range, but it is advantageous to work at temperatures between —10° and 300° C. The range from 130–200° C. is especially preferred for high temperature alkylation, while the range from —10° to 50° C. is preferred for low temperature alkylation.

The pressures to be used for the process of the invention are variable within any desired limits, provided only that the fundamental conditions are maintained, namely, that the catalyst liquid can be sprayed. It is accordingly possible to work at normal pressure, sub-atmospheric pressure or superatmospheric pressure. In particular, pressures lower than 50 atm., preferably in the range from 2–20 atm., are suitable as the preferred pressure range when using high pressures in the process of the invention.

Under certain conditions, here too the use of subatmospheric pressure may be necessary, namely if the boiling point of the reaction products under the reaction conditions is not much above the temperature of the sprayed liquid. In this case it is possible to lower the boiling point of the reaction products by the use of the subatmospheric pressure sufficiently to make them leave the reaction vessel of their own accord. This in turn permits a particularly simple and continuous form of carrying out the process of the invention.

The following examples further illustrate the invention.

*Example 1*

Preheated ethanol is passed at a speed of 1 litre per hour into a reaction vessel in accordance with the invention, in which phosphoric acid is sprayed in circulation at 235–240° C. After a single passage through the spraying zone, ethylene is formed with a yield of 30–40%.

*Example 2*

In a spraying apparatus in accordance with the invention, with a spraying height of 23 cm., syrupy phosphoric acid is sprayed at 125 to 130° C. Pure cyclohexanol with a content of about 7% water is conducted through the spraying zone at a speed of 1 litre per hour. After leaving the spraying zone, more than 90% of cyclohexene has been formed.

*Example 3*

3200 cc. of 85% phosphoric acid are sprayed at 270–300° C. in the apparatus referred to in Example 2. An aqueous 50% solution of cyclohexylamine is introduced at a speed of 1 litre per hour into the lower part of the spraying zone which is formed. Cyclohexene can be separated from the condensed reaction products in an amount of more than 90%.

*Example 4*

Using the apparatus and the conditions set out in Example 1, a 10% aqueous cyclohexylamine solution is introduced into the lower part of the spraying zone. After passage thereof through the spraying zone, the yield of cyclohexene is at least 80–85%.

*Example 5*

4000 g. of 98% sulphuric acid are sprayed in an apparatus in accordance with the invention at 165° C. An excess of benzene is introduced into the spraying zone at a speed of 2 litres per hour. After 9 hours, unreacted benzene is removed again quantitatively. Benzene sulphonic acid has been formed in the reaction vessel with a yield of more than 90%.

Example 6

Syrupy phosphoric acid is sprayed at a temperature of 160° C. in a spraying apparatus in accordance with the invention with a spraying height of 23 cm. Preheated acetone is introduced at a velocity of 2 litres per hour into the lower part of the spraying zone and the condensate collected at the top shows that the acetone has been almost completely converted into products with a higher boiling point.

Example 7

Substantially 60% caustic soda solution is sprayed at 150° C. in the apparatus of Example 6. Acetone is passed into the reaction chamber at a speed of 1 litre per hour. In this case also, analysis of the boiling points of the reaction products after leaving the spraying zone show that higher boiling products have been formed substantially quantitatively but that these products have a lower boiling range than those obtained by acid condensation.

Example 8

A mixture of 2,600 cc. of paraffin oil and 260 g. of benzene sulphonic acid is sprayed at a temperature of about 160° C. in a spraying apparatus in accordance with the invention and having a spraying height of 21 cm. Preheated acetone is conducted into the lower part of the spraying zone at a speed of 0.8 litre per hour. The condensate collected after travelling through the spraying chamber consists of more than 90% of higher boiling condensation products of acetone.

Example 9

In a spraying apparatus in accordance with the invention, a mixture of 3 litres of cyclohexanone, 3 litres of glacial acetic acid and 1.8 g. of manganese-(II)-nitrate is heated to 80–90° C. and sprayed in circulation. With the subsequent passage of oxygen, about 140 litres of pure oxygen per hour are taken up by the reaction mixture with formation of adipic acid. The reaction is continued until adipic acid starts to crystalize. The yield of adipic acid is almost quantitative, based on the quantity of oxygen taken up.

Example 10

In a spraying apparatus according to the invention, syrupy phosphoric acid is heated to 140° and thereafter sprayed in the reaction vessel by moving the rotor at 1000 r.p.m. The quantity of phosphoric acid is such that it is just sufficient for forming a uniform spraying zone, for which purpose 7 litres are required with the apparatus being used. The height of the spraying zone is 20 cm. A mixture of 50% acetic acid and 90% alcohol in a ratio of 1 mol of acetic acid to 1.5 mols of alcohol is then continuously supplied to the bottom of the reaction vessel at a speed of 2 litres per hour after having travelled through a preheater device. The reaction mixture removed at the top after passing through the spraying zone contains the acetiv ester with a yield of about 90%, calculated on the acetic acid introduced.

Example 11

In a spraying apparatus according to the invention with a spraying height of 23 cm., 2500 cc. of an aqueous zinc chloride melt with a content of about 70% zinc chloride are sprayed at 135°. About 100 cc. of 15% HCl per hour are now continuously added dropwise. Simultaneously, 400 cc. of substantially 70% acetic acid and 80 litres of a gas mixture consisting of 40% by volume of propylene and 60% by volume of propane are hourly introduced into the apparatus. The vapours are condensed after travelling through the spraying zone and the formed acetic acid propyl ester, as well as a small quantity of diisopropyl ether, are separated from the aqueous phase and distilled. Over a reaction period of about 10 hours, it is possible to obtain approximately 530 cc. of crude acetic acid propyl ester.

Example 12

3 litres of 85% phosphoric acid are sprayed at 125° C. in a spraying apparatus as in Example 11. A mixture of 10% aqueous acetic acid and the corresponding molecular quantities of alcohol is continuously conducted through the spraying zone at a speed of 2½ litres per hour. The reaction mixture extracted at the top after travelling through the spraying zone contain acetic acid ethyl ester with a yield of at least 70%.

Example 13

3000 cc. of 85% phosphoric acid are heated to 180–190° C. and sprayed. As described, a 40% methanol solution of benzoic acid are continuously introduced into the lower part of the spraying zone at a rate of 1 liter per hour. After distilling off the non-reacted water containing alcohol the reaction product consists to more than 80% of methyl benzoate.

Example 14

3000 cc. of 85% phosphoric acid are heated to about 150° C. in the spraying apparatus according to the invention with a spraying height of 21 cm. and sprayed in circulation. A mixture of acetic acid and diisopropyl-ether in a molar ratio of 1:1 and preheated to about 100° C. is continuously introduced to the bottom of the reaction vessel through this spraying zone at a rate of 1 litre per hour. The condensed reaction mixture is washed with water and the non-reacted diisopropylether is distilled off from the acetic acid isopropylester formed by the reaction.

Example 15

Under the conditions of Example 14 a mixture of acetic acid and ethylether in a molar ratio of 1:0.5 is passed through the spraying zone. The condensed reaction product contains acetic acid ethylester in a good yield.

Example 16

A mixture of monochloro-acetic acid and ethyl alcohol in a molar ratio 1:1 is introduced to the spraying zone under the conditions of Example 14. Thus obtained chloroacetic acid ethyl ester is separated from the condensation products in usual manner.

Example 17

Under the conditions of Example 14 a mixture of propionic acid and ethyl alcohol in a molar ratio 1:1 is passed through the spraying zone. There is obtained propionic acid ethyl ester in a yield of more than 80%.

Example 18

A 25% solution of p-toluic acid in methanol and about 0.3 litre per hour water, which passes through a preheater with a temperature of about 140° C., are simultaneously conducted through the spraying zone under the conditions of Example 14. The lower layer of the condensate consists of pure p-toluic acid methylester which after a short time solidifies to a crystalline slurry, melting point 33° C.

Example 19

Phosphoric acid is heated to 240–250° C. and thereafter sprayed in circulation in a reaction device according to the invention having a spraying height of 14 cm. After a mixture of benzene and ethylene in the ratio of one part of ethylene to 10 parts of benzene has passed through a preheater, this mixture is conducted through this spraying zone at a speed of 1 litre of benzene per hour and continuously to the bottom of the reaction vessel. The working up of the reaction products shows that considerable amounts of alkylated benzenes were formed.

*Example 20*

85% phosphoric acid is heated to 140° and sprayed in a spraying apparatus with a spraying height of 21 cm. at 1000 r.p.m. A mixture of benzene and isopropyl alcohol in a mol ratio of 1:0.2 is preheated to about 130° and continuously introduced at a speed of 1.2 litres per hour into the lower part of the spraying zone. After travelling through the spraying zone, the reaction mixture is condensed at the top of the apparatus on a reflux condenser. From the condensed reaction mixture, there is first of all distilled off the excess of benzene. The remaining alkylated products contain about 30% of monoisopropyl benzene, about 40% of diisopropyl benzene, the remainder being more highly alklated compounds.

*Example 21*

Under the conditions and using the apparatus as set out in Example 20, toluene and isopropyl alcohol are reacted in a mol ratio of 1:0.25. Alkylated toluenes are obtained with a content of about 40% monosubstituted products, about 30% of disubstituted products and about 30% of more highly substituted products.

*Example 22*

An aqueous melt of zinc chloride with a zinc chloride content of about 70% is sprayed at 150° C. into the spraying apparatus according to the invention with a spraying height of about 21 cm. Toluene and isopropyl alcohol in a mol ratio of 1:0.25 are introduced at a delivery rate of 1.5 litres per hour into the lower part of the spraying zone through the sprayed catalyst layer which is formed, the said layer containing the catalyst in solution. The alkylated products isolated from the recondensed reaction products contain about 40% of monoisopropyl toluene, in which p-cymene is the predominant reaction product.

*Example 23*

An aqueous melt of $AlCl_3 \cdot 6H_2O$ is sprayed at 130° C. into the apparatus of Example 22. Toluene and isopropanol in a molar ratio of 1:0.25 is conducted at a rate of 1.5 litres per hour through the sprayed catalyst layer which is formed and which contains the catalyst in solution. The alkylated products separated from the condensed reaction product consist of about 40% of monoisopropyl toluene, the p-cymene representing again the predominant reaction product.

*Example 24*

According to the process described in Example 20 a mixture of toluene and ethanol in a molar ratio of 1:0.2 and preheated to 160° C. is introduced into sprayed benzene-sulphonic acid which is heated to 150° C. The speed of introduction in this case is 1.5 litres per hour. The alkylated products are separated from the reaction product after passing through the spraying zone, the conversion amounting to about 60% based on the ethyl alcohol; the alkylated products consist of about 75% of monoalkylated toluenes and of about 25% of more highly alkylated products.

*Example 25*

Toluene preheated to 150° C. is conducted at a speed of about 1 litre per hour through sprayed benzene-sulphonic acid heated to 150° C. At the same time, gaseous ethylene is introduced through the spraying zone at a speed of about 2 mols per hour. The monosubstituted ethyl toluene can be separated from the condensed reaction product in an amount of about 65%.

*Example 26*

A mixture of toluene and methanol in a mol ratio of 1:0.2 and preheated to 150° C. is supplied at a delivery velocity of about 1 litre per hour through a sprayed layer of benzene-sulphonic acid which is heated to 160° C. as described in Example 20. After distilling off the unreacted toluene, alkylated toluenes can be recovered from the condensed reaction product with a content of about 30% xylene.

*Example 27*

Using the method described in Example 20, benzene and ethyl alcohol admixed in a molar ratio of 1:0.25 are supplied at a flow velocity of 1.5 litres per hour into sprayed benzene-sulphonic acid heated to 150° C. After distilling off the unreacted benzene, the condensed reaction products yield about 65% of monoethyl benzene and about 35% of more highly substituted products.

*Example 28*

In the spraying apparatus according to the invention with a spraying height of 40 cm. syrupy phosphoric acid is heated to 240–250° C. and sprayed in circulation. A mixture of 1 part by weight of aniline with 1.5 parts by weight of ethanol, after passing through a preheater, is continuously introduced at a velocity of 10 litres per hour into the lower part of the spraying zone which is formed. After having passed twice through the formed spraying zone, the reaction product contains about 40% of N-alkylated diethyl aniline and about 60% of products which are more highly alkylated in the nucleus.

*Example 29*

In a spraying apparatus with a spraying height of 21 cm. a mixture of 2.2 litres 85% phosphoric acid and 0.8 litre paraffin oil is emulsified and sprayed at 180–190° C. Thereupon a mixture of benzene and isopropyl alcohol in a molar ratio of 1:0.2 and preheated to 125° C. is continuously introduced at a rate of 1 litre per hour. Excess benzene is distilled off from the condensed reaction mixture. The remaining alkylated products contain about 40% mono-isopropyl benzene, 40% diisopropyl benzene the residue consisting of higher alkylated compounds.

*Example 30*

Toluene and isopropyl alcohol are reacted in a molar ratio of 1:0.2 under the conditions and in the apparatus of Example 29. There is obtained an alkylated toluene with a content of approximately 50% mono-substituted 30% di-substituted and 20% higher substituted products.

*Example 31*

A mixture of 1.5 litres 85% phosphoric acid and 1000 g. $NaH_2PO_4$, in 1000 cc. water and 1000 cc. paraffin oil is heated to 190–200° C. under spraying. Toluene and isopropyl alcohol in a molar ratio of 1:0.2 are conducted through the formed catalytic spray layer at a rate of 1.2 litres per hour. There is obtained an alkylated toluene containing approximately 50% monosubstituted, 20% di-substituted and 30% higher substituted products.

*Example 32*

In the spraying apparatus according to the invention a mixture of 2 litres paraffin oil and 820 g. zinc chloride is dissolved in 1 litre water, sprayed and heated to 180–190° C. A mixture of toluene and isopropyl alcohol preheated to 150° C. is introduced into the lower part of the spraying zone at a rate of 1 litre per hour. After separation from the condensed reaction products the alkylated products contain approximately 50% monoisopropyl toluene, the predominant reaction product of which is p-cymene.

*Example 33*

After addition of 60 g. finely divided copper and 40 g. finely divided zinc 2.6 litres 85% phosphoric acid are sprayed and heated to 160° C. Into the lower part of the spraying zone there is continuously introduced a mixture of toluene and ethyl alcohol at the rate of 1 litre per hour, said mixture being preheated at 150° C. After passage through this spraying zone, the alkylated products are separated from the reaction product. They consist to approximately 60% of mono alkylated toluene and to the rest of higher alkylated compounds.

*Example 34*

A mixture of 1900 cc. di- and higher alkylated toluenes and 1200 g. anhydrous aluminum chloride are heated to 120–130° C. and sprayed in a spraying apparatus with a spraying height of 21 cm. Benzene is preheated to approximately 100° C. and continuously introduced into the lower part of the spraying zone at a rate of 1 litre per hour. Excess benzene is distilled off from the condensed reaction products. The residue consists of approximately 50% mono-alkylated, 20% di-alkylated and 30% higher alkylated benzene.

*Example 35*

Into the mixture of Example 34 there is introduced under the same conditions and under use of the same apparatus benzene previously heated to 120° C. at a rate of 1 litre per hour and ethylene at a rate of 60–70 litres per hour. After distilling off the non-reacted benzene there is obtained a residue consisting of mono-alkylated and higher alkylated benzene.

*Example 36*

3000 cc. 85% phosphoric acid are heated to 190–200° C. and sprayed in a spraying apparatus according to the invention with a spraying height of 21 cm. As previously described, a mixture of benzene and 1-2-ethylene chloride in a molar ratio of 1:1 is conducted into the lower part of the spraying zone at a rate of approximately 0.8 litre per hour. Excess benzene is distilled off from the condensed reaction mixture. The residue consists of dibenzyl and of other alkylated hydrocarbons.

*Example 37*

In the spraying apparatus according to the invention, 3000 cc. 96% p-xylene containing 2 g. cobalt naphthenate in solution are heated to 125–130° C. and sprayed in circulation. Thereupon pure oxygen is introduced with a rate of approximately 2 mol per hour and the temperature in the apparatus is so regulated that the water formed from the oxydation is continuously discharged by the xylene. The reaction solution is discharged after 5 hours. After cooling, there are obtained 700 g. of a crystalized acid, which consists to approximately 80% of p-toluic acid and to approximately 20% of terephthalic acid.

*Example 38*

Under the conditions enumerated in the preceding example, 3000 cc. of a commercial xylene are oxydized. After a period of 5 hours about 10 mols. water have been formed by the oxydation. After prolonged standing, there crystallize from the reaction mixture about 500 g. of acids which consist predominantly of toluic acids.

*Example 39*

3000 cc. 85% phosphoric acid are heated to 180–190° C. and sprayed in a spraying apparatus according to the invention with a spraying height of 21 cm. As previously described a 10% solution of isopropylether in toluene is conducted into the lower part of the spraying zone at a rate of approximately 1 litre per hour. Excess toluene is distilled off from the condensed reaction mixture. The residue consists of alkylated toluenes.

*Example 40*

A mixture of toluene and methanol in a molar ratio of 1:0.2 is preheated to 150° C. and conducted through a spraying layer of 2.2 litres methan disulphonic acid (methionic acid) heated to 140° at a rate of approximately 1 litre per hour, as described in Example 8. After distilling off the non-reacted toluene alkylated toluenes with a content of approximately 30% xylene can be recovered from the condensed reaction products.

What I claim is:

1. A process for carrying out chemical reactions involving at least one gaseous and at least one liquid component, which comprises maintaining a sump of a liquid reaction component, centrifugally forcing said liquid component from said sump at high speed as a dispersion spray into a reaction zone, passing said gaseous reaction component into said reaction zone, returning sprayed component into said sump and regulating the liquid volume within said sump and the rate of said liquid component spray so that an appreciable amount of returned liquid component is continuously and substantially immediately fed to said reaction zone by centrifugal forcing.

2. Process according to claim 1, which comprises maintaining said sump below said reaction zone in open communication therewith and wherein said sprayed component is gravity-returned to said sump.

3. Process according to claim 1, wherein one of said liquid components is a catalyst, said catalyst being incorporated in a liquid which is inert with respect to the other components, said catalyst being sprayed into the reaction zone and thereafter passing the gaseous and liquid components to be reacted in the presence of said catalyst into said reaction zone.

4. Process according to claim 3, wherein the boiling point of the liquid catalyst component under the reaction conditions is higher than the reaction temperature, said reaction temperature in its turn being higher than the boiling point of the reaction products under the reaction conditions, and which comprises spraying said liquid catalyst into the reaction zone with recycling, introducing the reaction components into the reaction vessel in the form of a spray, and removing the reaction products by vaporization beyond the zone of spraying.

5. A process for the production of ring-alkylated aromatic compounds involving at least one gaseous and at least one liquid component, which comprises maintaining a sump of the liquid reaction component, centrifugally forcing a catalyst which is liquid under the reaction conditions as a dispersion spray into a reaction zone so that the reaction zone is substantially completely filled with a whirling catalytically effective liquid, said catalyst being a member selected from the group consisting of phosphoric, hydrochloric, aromatic and aliphatic sulfonic acids, mixtures thereof and acid-reacting metal salts in aqueous liquid form, substantially continuously passing into said reaction zone an aromatic compound together with an alkylating agent, said aromatic compound being a member selected from the group consisting of benzene, toluene and ethyl benzene, at a temperature between −10° and 300° C. and a pressure below 50 atmospheres, returning sprayed component into said sump and regulating the liquid volume within said sump and the rate of said liquid component spray so that an appreciable amount of returned liquid component is continuously and substantially immediately re-fed to said reaction zone.

6. Process according to claim 5, wherein the alkylating agent is a member selected from the group consisting of alcohols, ethers, alkyl halides and olefins.

7. A process for the production of carboxylic acid esters involving at least one gaseous and at least one liquid component, which comprises maintaining a sump of the liquid reaction component, centrifugally forcing a catalyst which is liquid under the reaction conditions as a dispersion spray into a reaction zone so that the reaction zone is substantially completely filled with a whirling catalytically effective liquid, said catalyst being selected from the group consisting of phosphoric, sulfuric, hydrochloric, aromatic aliphatic sulfonic acids, mixtures thereof and acid reacting metal salts in aqueous solution, substantially continuously passing into said reaction zone a member selected from the group consisting of carboxylic acids, carboxylic acid anhydrides and carboxylic acid esters, together with an esterifying agent selected from the group consisting of alcohols, ethers and olefins, returning sprayed component into said sump and regulating the liquid volume within said sump and the rate of said liquid component spray so that an appreciable amount of returned liquid component is continuously and substantially immediately re-fed to said reaction zone.

References Cited in the file of this patent

UNITED STATES PATENTS

| | | |
|---|---|---|
| 1,082,245 | Thomas | Dec. 23, 1913 |
| 1,447,898 | Schlossstein | Mar. 6, 1923 |
| 1,662,602 | Dunkelberg | Mar. 13, 1928 |
| 2,134,571 | Morlock | Oct. 25, 1938 |
| 2,245,528 | Loder | June 10, 1941 |
| 2,463,262 | Goldsby | Mar. 1, 1949 |
| 2,712,492 | Mackay et al. | July 5, 1955 |
| 2,747,003 | Kilpatrick | May 22, 1956 |

OTHER REFERENCES

Degering: An Outline of Organic Nitrogen Compounds, pages 298–9 (1950).

Conant: The Chemistry of Organic Compounds, pages 139–45 (1952).

Miller: J.C.S. (London), pages 260–4 (1953).

Fieser: Introduction to Organic Chem., pages 96–7 (1957).

Groggins: Unit Processes in Org. Syn., pages 377–8, 804–21 (1958).